United States Patent
Schmidt et al.

(10) Patent No.: US 11,016,520 B2
(45) Date of Patent: May 25, 2021

(54) ADJUSTABLE PEDAL FOR A MOTOR VEHICLE

(71) Applicant: AUDI AG, Ingolstadt (DE)

(72) Inventors: Oliver Schmidt, Geisenfeld (DE); Rene Pahlig, Zwickau (DE)

(73) Assignee: AUDI AG, Ingolstadt (DE)

( * ) Notice: Subject to any disclaimer, the term of this patent is extended or adjusted under 35 U.S.C. 154(b) by 156 days.

(21) Appl. No.: 15/741,535

(22) PCT Filed: Jul. 15, 2016

(86) PCT No.: PCT/EP2016/001232
§ 371 (c)(1),
(2) Date: Jan. 3, 2018

(87) PCT Pub. No.: WO2017/025168
PCT Pub. Date: Feb. 16, 2017

(65) Prior Publication Data
US 2018/0210482 A1     Jul. 26, 2018

(30) Foreign Application Priority Data

Aug. 7, 2015 (DE) .......................... 102015010374.1

(51) Int. Cl.
*G05G 1/405* (2008.04)
*B60K 26/02* (2006.01)
(Continued)

(52) U.S. Cl.
CPC ............ *G05G 1/405* (2013.01); *B60K 23/02* (2013.01); *B60K 26/02* (2013.01); *B60T 7/06* (2013.01);
(Continued)

(58) Field of Classification Search
CPC ............ G05G 1/30; G05G 1/40; G05G 1/405; G05G 1/44; G05G 1/445; G05G 1/54;
(Continued)

(56) References Cited

U.S. PATENT DOCUMENTS 5,996,438 A * 12/1999 Elton ........................ G05G 1/40
74/512
6,019,015 A * 2/2000 Elton ....................... G05G 1/405
74/512
(Continued)

FOREIGN PATENT DOCUMENTS

CN     203793134 U     8/2014
CN     204149869 U     2/2015
(Continued)

OTHER PUBLICATIONS

Notification of Transmittal of Translation of the International Preliminary Report on Patentability dated Feb. 22, 2018, in connection with corresponding international Application No. PCT/EP2016/001232 (8 pgs.).

(Continued)

*Primary Examiner* — Prasad V Gokhale
(74) *Attorney, Agent, or Firm* — Maier & Maier, PLLC

(57) ABSTRACT

An adjustable pedal for a motor vehicle, including a pedal arm rotatably mounted on a bearing block, a pedal base body adjustably mounted relative to the pedal arm, as well as a pedal plate provided with an actuation surface arranged on the lower end of the pedal base body. The pedal base body is rotatably mounted on the pedal arm in such a way that an adjustment causes an arcuate movement of the pedal base body and of the pedal plate arranged therein. The pedal plate is rotatably mounted on the pedal base body about a pivot point so that the pedal plate is operatively connected to the mechanism which causes during an adjustment of the pedal (Continued)

base body relative to the pedal arm a forcibly guided rotational movement of the pedal plate about the pivot point.

3 Claims, 3 Drawing Sheets

(51) Int. Cl.
    *B60T 7/06*     (2006.01)
    *B60K 23/02*     (2006.01)
    *G05G 1/44*     (2008.04)

(52) U.S. Cl.
    CPC .. *B60K 2023/025* (2013.01); *B60K 2026/026* (2013.01); *G05G 1/44* (2013.01)

(58) Field of Classification Search
    CPC .......... G05G 7/04; B60K 23/00; B60K 23/02; B60K 26/02; B60K 2023/025; B60K 2026/026; B60T 7/06
    See application file for complete search history.

(56) References Cited

U.S. PATENT DOCUMENTS

| | | | | |
|---|---|---|---|---|
| 6,155,133 | A * | 12/2000 | Swansegar | B60K 26/02 74/512 |
| 6,212,970 | B1 * | 4/2001 | Bortolon | G05G 1/405 74/512 |
| 6,367,349 | B1 * | 4/2002 | Allen | G05G 1/405 74/512 |
| 2002/0053254 | A1 * | 5/2002 | Rixon | B60T 7/06 74/560 |
| 2003/0110879 | A1 * | 6/2003 | Massey, III | G05G 1/405 74/512 |
| 2005/0115355 | A1 | 6/2005 | Stender | |
| 2016/0004271 | A1 * | 1/2016 | Gregory | B60W 50/10 701/22 |

FOREIGN PATENT DOCUMENTS

| | | |
|---|---|---|
| DE | 19923697 A1 | 11/2000 |
| DE | 10014531 A1 | 8/2001 |
| DE | 10246881 A1 | 4/2004 |
| DE | 10335403 A1 | 3/2005 |
| DE | 102006053408 A1 | 5/2008 |
| WO | 0177772 A1 | 10/2001 |

OTHER PUBLICATIONS

German Search Report dated Apr. 7, 2016 of corresponding German application No. 102015010374.1; 4 pgs.

Translation of International Search Report dated Feb. 22, 2018, in corresponding Application No. PCT/EP2016/001232; 10 pages.

* cited by examiner

ADJUSTABLE PEDAL FOR A MOTOR VEHICLE

FIELD

The invention relates to an adjustable pedal for a motor vehicle of the type according to the preamble of patent claim 1.

BACKGROUND

Adjustable pedals for motor vehicles are well known from prior art. The position of a pedal with respect to the body size of the driver can be adjusted in this manner, in particular by moving the pedal in the footwell toward the driver for smaller persons, or so that the pedal is moved further away from the driver in the footwell for taller persons.

Such an adjustable pedal for a motor vehicle is disclosed for example in DE 103 35 403 A1. The pedal described in this document includes an upper pedal arm, as well as a lower pedal arm which is adjustable relative to the upper pedal arm and equipped with a pedal plate. During an adjustment of the pedal, the lower pedal arm and thus also the pedal arm that is arranged on it in a fixed manner carry out an arcuate movement. The resulting effect of the arcuate movement of the pedal arm and of the pedal plate arranged thereupon is that the inclination angle of the pedal plate is also changed during the adjustment. This proves to be disadvantageous especially during an adjustment of the pedal from the "tall person" position to the position of a "small person" because a change of the inclination angle of the pedal plate that results from the adjusting operation will cause in the pedal position "small person" the actuation point (=the contact point of the driver's foot with the pedal plat) to "migrate" to the edge of the pedal plate so that there is a risk that the foot will slip off the pedal when the pedal is pressed.

SUMMARY OF THE DISCLOSURE

The objective of the invention is to further develop an adjustable pedal for a motor vehicle of the type according to the preamble of patent claim 1 so that the risk of slipping off the pedal plate is minimized.

In a known manner, the adjustable pedal for a motor vehicle comprises a pedal arm which is rotatably mounted on a bearing block, as well as a pedal base body which is movable relative to the pedal arm, and a pedal plate arranged at the lower end of the pedal body which is provided with an actuation surface. In addition, the pedal base body is arranged so that it can be adjusted on the pedal arm in such a way so as to carry out an arcuate movement with an adjustment of the pedal base body and of the pedal plate arranged on it, so that the adjustment causes a change of the inclination angle of the pedal plate.

According to the invention, the pedal plate is rotatably mounted about a pivot point, wherein the pedal plate is operatively connected to the means, which causes a forcibly guided rotational movement of the pedal plate about the pivot point with an adjustment of the pedal base body relative to the pedal arm.

The rotational movement of the pedal plate which is initiated and forcibly guided by these means can be in this case directed both in the opposite direction to the arcuate movement in order to compensate for the change in the inclination angle, as well as in the same direction as the arcuate movement, which is required for example with SUVs.

The effect of the embodiment the pedal, which is adjustable according to the invention, is that with an adjustment of the pedal from the pedal position "tall person" to the pedal position "small person" by rotating the pedal plate relative to the pedal arm, the actuation point B (=the contact point of the foot of the driver with the pedal plate), the relative position to the pedal plate is maintained, which is to say a "migration" of the actuation point B to the edge of the pedal plate is prevented and the risk of slipping from the pedal plate is thus minimized.

According to an embodiment of this invention, the pedal plate is rotated about the pivot point in such a way that in the pedal position "tall person", in the normal actuation point on the actuation surface of the pedal plate, the directed actuation vector maintains throughout the adjustment movement its orthogonal alignment to the actuation surface of the pedal plate. This makes it possible to ensure in an advantageous manner that for example after an adjustment of the pedal from the pedal position "tall person" to the pedal position "small person" by rotating the pedal plat, the change of the angle of the pedal plate toward the actuation factor is compensated for or equalized, so that the risk of slipping is further minimized.

According to another embodiment of the invention, the pedal plate is rotated about the pivot point in such a way that after an adjustment of the pedal, for instance after an adjustment from the pedal position "tall person" to the pedal position "small person", an actuation factor is on the actuation surface of the pedal plate normally always directed towards the actuation surface of the pedal plate. This proves to be very advantageous because even big changes of the actuation angle can thus be compensated for in this manner.

Such big changes of the actuation angle occur for example when smaller persons adjust the driver's seat upwards and in the forward direction in order to improve their field of vision and also to make the pedals easier to reach, because when the hip point of the driver is moved forward as a result of an adjustment of the seat, the foot is arranged at a steeper angle to the pedal plate of the pedal.

It is preferred when the means forcibly guiding the rotational movement of the pedal plate are designed in the form of a Bowden cable or in the form of a slotted guide.

BRIEF DESCRIPTION OF THE DRAWING

Further advantages, features and possible applications of the present invention will become evident from the following description in conjunction with the embodiment illustrated in the figures.

DETAILED DESCRIPTION OF THE DRAWING

Figure 1:
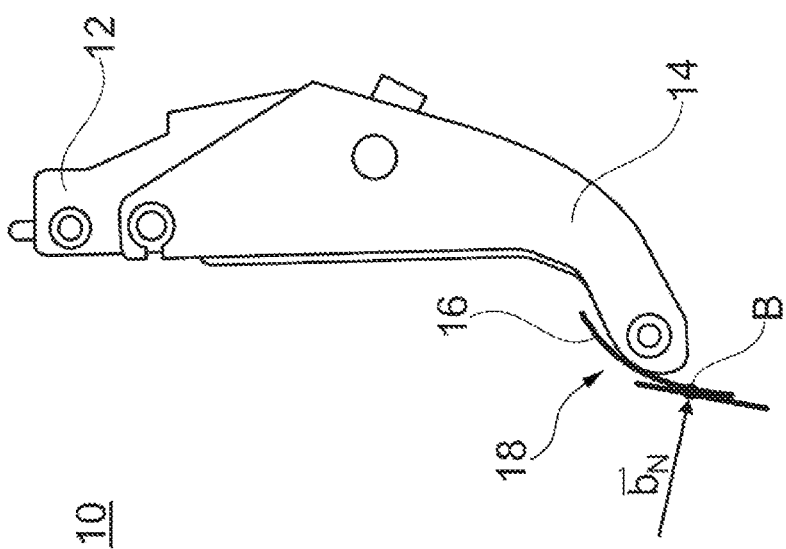
FIG. 1 shows an adjustable pedal in the position "tall person" and in the pedal position "small person" according to prior art.
Figure 1:
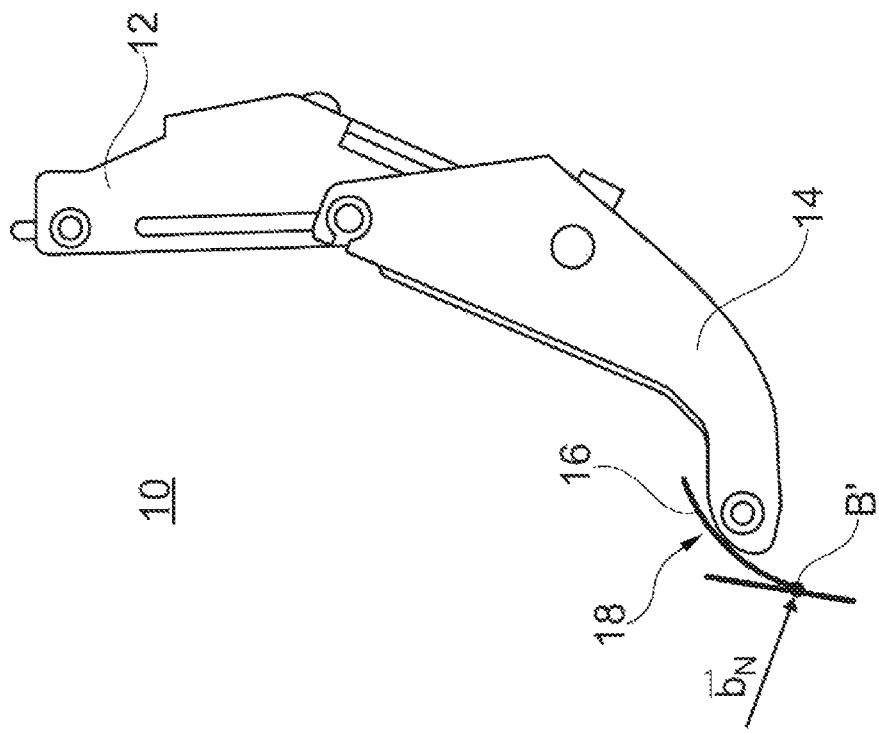

FIG. 1 shows an adjustable pedal for a motor vehicle which is generally designated by the numeral 10. While the illustration on the left side shows the pedal 10 in the pedal position "tall person, on the right side is illustrated the pedal 10 in the pedal position "small person".

The pedal 10 comprises a pedal arm 12, which is rotatably mounted on a bearing block—not shown here for reasons of clarity. The pedal 10 further includes a pedal base body 14 which is adjustable relative to the pedal arm 12, as well as a pedal plate 16 which is arranged at the lower end of the pedal base body 14. The surface of the pedal plate 16, which is directed into the footwell, will be hereinafter referred to as actuating surface 18.

As can be further also seen from FIG. 1, with an adjustment of the pedal 10 from the pedal position "tall person" to the pedal position "small person", the pedal base body 14 is moved downward relative to the pedal arm 12 and at the same time forward in the footwell, which is to say that both the pedal base body 14 as well as the pedal plate 16 that is rigidly arranged on it carry out an arcuate movement that causes a change of the inclination angle of the pedal plate 16.

The consequence of this is that in the pedal position "tall person", the actuation vector $\vec{b}_N$ of the pedal plate 16 which is normally on actuation surface 18 in the actuation point B "migrates" as it is oriented after the adjustment of the pedal 10 toward the actuation point B' at the lower edge of the pedal plate 16. As can be further also seen in FIG. 1, in the pedal position "small person", a steeper angle is created by the actuation vector $\vec{b}$ migrated to the actuation point B' with the actuation surface 18. As a result of the "migration" and of the changed angle of the actuation vector $\vec{b}$, there is an increased risk of slipping in the pedal position "small person".

Therefore, the invention is now used as follows:

In order to minimize the risk of slipping in the pedal position "small person", the pedal plate 16 is according to the invention rotatably mounted about a pivot point 20 on the pedal base body so that the pedal plate 16 is operatively connected to the means which cause with an adjusting movement of the pedal base body 14 relative to the pedal arm 12 a forcibly performed rotational movement of the pedal plate 16 about the pivot point 20.

Figure 2:
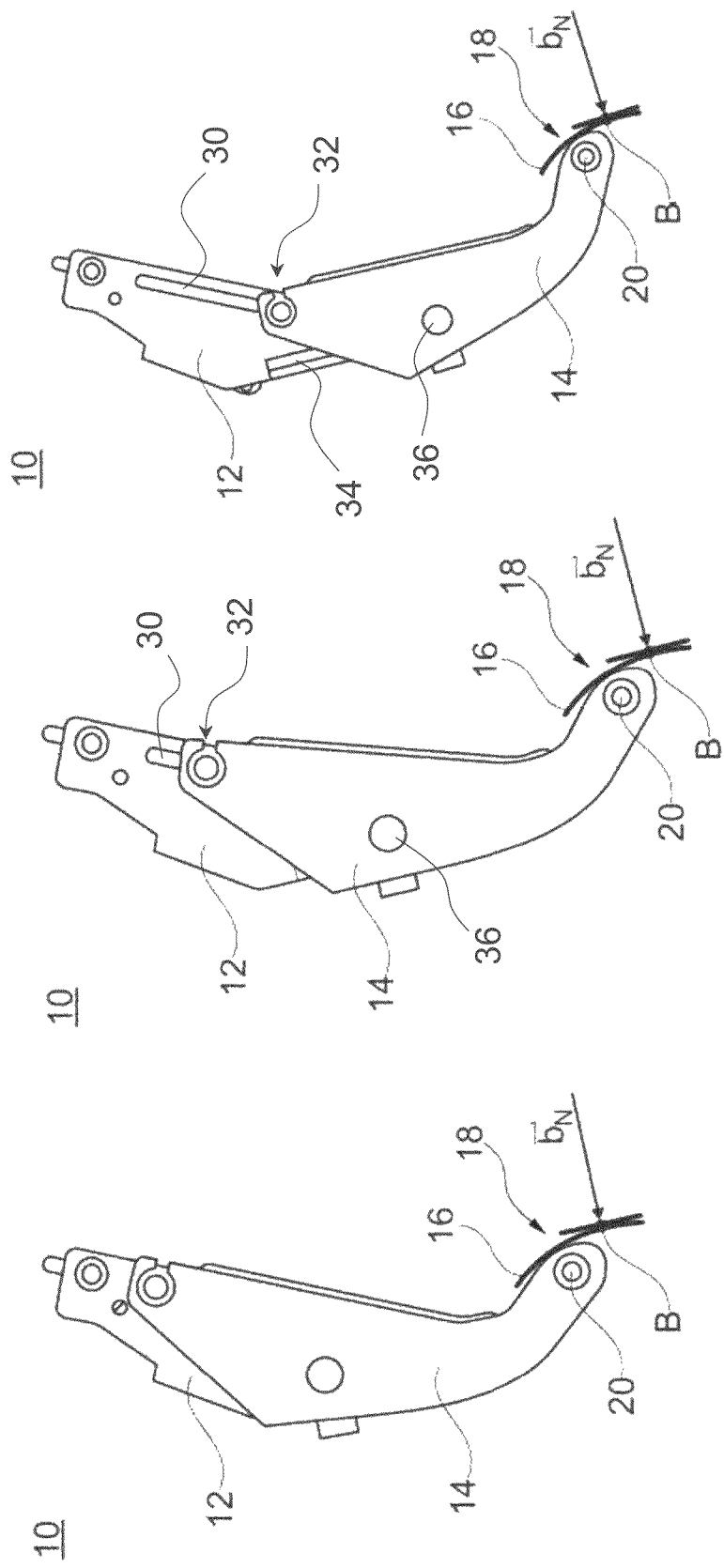
FIG. 2 shows an adjustable pedal according to the invention in different pedal positions.
Figure 3:
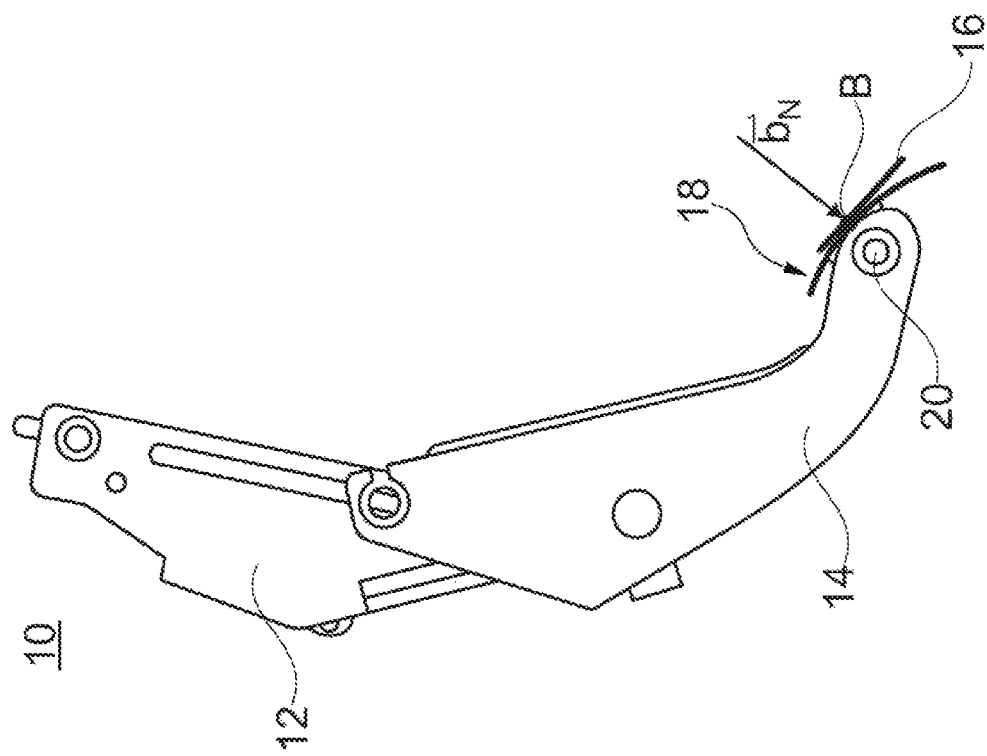
FIG. 3 shows the adjustable pedal of FIG. 2 with a variable angle compensation with a big actuation angle change.
Figure 3:
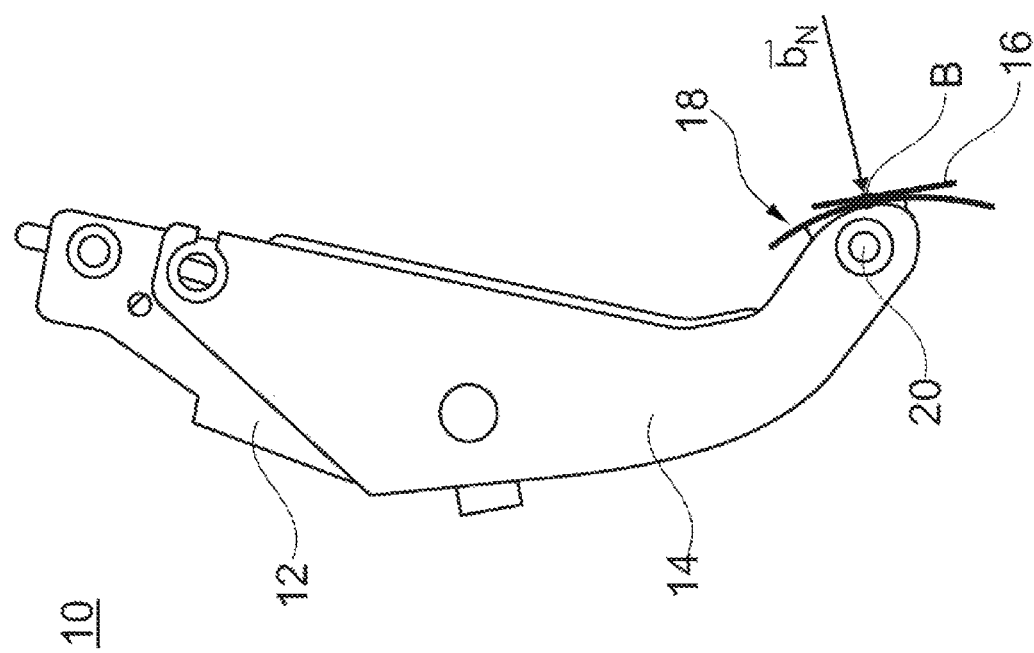

The effect achieved in this manner is illustrated in FIG. 2 and FIG. 3.

FIG. 2 shows a pedal 10 according to the invention in three pedal positions, namely in the pedal position "tall person" on the left side, in the pedal position "small person" on the right side, and in a position in between in the center of the figure. The pedal base body 14 is slidably affixed to two tracks 30, 34 in the pedal arm 12 by mounting pieces 32, 36, engaged with tracks 30, 34.

As shown in FIG. 2—in accordance with FIG. 1—in the pedal position "tall person", the actuation vector $\vec{b}_N$ is in the actuation point B oriented normally toward the actuation surface 18 of the pedal plate 16. As can be seen in both of the other illustrations in FIG. 2, a rotational movement is performed with an adjustment process of the pedal plate 16, so that change of the inclination angle of the pedal plate occurring during an adjustment of the pedal 10 is compensated for and the consequence is that a "migration" of the actuation vector $\vec{b}_N$ on the pedal plate 16 is prevented.

In addition, the pedal plate 16 is rotatable mounted and forcibly guided in such a manner that the actuation vector $\vec{b}_N$ maintains its orthogonal orientation to the actuation surface 18 of the pedal plate 16 throughout the adjusting movement. This makes it possible to ensure that with an adjustment from the pedal position "tall person", both the normal orientation of the actuation vector $\vec{b}_N$ as well as its relative position on the pedal plate 16 will be maintained and the adjustment process thus has no influence on the risk of slipping.

FIG. 3 shows another embodiment of the pedal 10 according to the invention with a variable angle compensation at a higher actuation angle change.

Such big changes of the actuation angle occur for example when—as shown in the illustration on the left—the pedal position remains in the pedal position "tall person" and the driver of the motor vehicle moves the driver seat in order to improve the field of vision or for better accessibility of the pedals forward and then again upward, or—as shown in the drawing on the right—in addition to adjusting the seat forward and upward, adjusts accordingly also the pedals in the pedal position "small person": and due to the adjustment of the seat forward and upward, the hip point of the driver is moved upward and forward, so that the foot of the driver is arranged at a steeper actuation angle to the pedal plate 16 of the pedal 10 and it migrates upward in the actuation point B on the pedal plate.

In order to minimize the risk of slipping also with the described large actuation angle changes, according to the embodiment of the pedal 10 in accordance with the invention, the pedal plate 16 is forcibly guided and rotated about the pivot point 20 in such a way that an actuation vector $\vec{b}_N$ which is aligned with the actuation surface 18 of the pedal plate 16 is normally oriented toward the actuation surface 18 of the pedal plate 16.

The invention claimed is:

1. An adjustable pedal for a motor vehicle, comprising:
   a pedal arm, which is rotatably mounted on a bearing block, wherein the pedal arm has two tracks cut through the pedal arm body;
   a rigidly-defined, unitary pedal base body, which is adjustably mounted relative to the pedal arm, wherein the pedal base body is slidably affixed to each of the two tracks in the pedal arm by mounting pieces passing through each of the tracks and configured to slide along the two tracks so as to adjust the orientation of the pedal base body in relation to the pedal arm, as well as
   a pedal plate, provided with an actuation surface arranged at a lower end of the pedal base body, wherein the pedal plate is pivotably attached to the pedal base body about a lone pivot point,
   wherein the pedal base body is adjustably mounted on the pedal arm in such a way that an adjustment causes an arcuate movement of the pedal base body and of the pedal plate arranged therein, wherein the pedal plate is rotatably mounted on the pedal base body about the lone pivot point so that the pedal plate is capable of moving about the lone pivot point with an adjusting movement of the pedal base body relative to the pedal arm.

2. The adjustable pedal according to claim 1, wherein the pedal plate is rotated about the pivot point in such a way that an actuation vector which is normally oriented in an actuation point on the actuation surface of the pedal plate maintains an orthogonal orientation toward the actuation surface of the pedal plate throughout the adjusting movement.

3. The adjustable pedal according to claim 1, wherein the pedal plate is rotated about the pivot point in such a way that after the adjustment of the pedal, an actuation vector oriented toward the actuation surface of the pedal plate is always directed normally to the actuation surface to the pedal plate.

\* \* \* \* \*